United States Patent
Wang et al.

(10) Patent No.: US 10,394,100 B2
(45) Date of Patent: Aug. 27, 2019

(54) LIQUID CRYSTAL PANEL AND ARRAY SUBSTRATE THEREOF

(71) Applicant: Wuhan China Star Optoelectronics Technology Co., Ltd., Wuhan, Hubei (CN)

(72) Inventors: Cong Wang, Hubei (CN); Zuomin Liao, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/326,572

(22) PCT Filed: Dec. 26, 2016

(86) PCT No.: PCT/CN2016/112156
§ 371 (c)(1),
(2) Date: Oct. 5, 2017

(87) PCT Pub. No.: WO2018/082169
PCT Pub. Date: May 11, 2018

(65) Prior Publication Data
US 2018/0210250 A1    Jul. 26, 2018

(30) Foreign Application Priority Data
Nov. 2, 2016    (CN) .......................... 2016 1 0958139

(51) Int. Cl.
*H01L 27/14*    (2006.01)
*G02F 1/1368*    (2006.01)
(Continued)

(52) U.S. Cl.
CPC ...... *G02F 1/1368* (2013.01); *G02F 1/134336* (2013.01); *G02F 1/136209* (2013.01);
(Continued)

(58) Field of Classification Search
CPC ............... G02F 1/136; G02F 1/134336; G02F 1/136204; G02F 1/136286
See application file for complete search history.

(56) References Cited

U.S. PATENT DOCUMENTS

| | | | |
|---|---|---|---|
| 2010/0099324 A1 | 4/2010 | So | |
| 2015/0138054 A1* | 5/2015 | Nakamura | G09G 3/20 345/88 |

(Continued)

FOREIGN PATENT DOCUMENTS

| | | |
|---|---|---|
| CN | 1836188 | 9/2006 |
| CN | 101349845 | 1/2009 |

(Continued)

OTHER PUBLICATIONS

Office Action and Search Report, dated Dec. 18, 2017, for Chinese Patent Application No. 201610958139.6.

(Continued)

*Primary Examiner* — Phuc T Dang

(57) ABSTRACT

Disclosed is an array substrate, which includes: a transparent baseplate, wherein the transparent baseplate includes pixel regions on one surface thereof, and the pixel regions each include a white sub-pixel region, a first primary color sub-pixel region, a second primary color sub-pixel region and a third primary color sub-pixel region; a plurality of pixel electrodes that are arranged in the white sub-pixel region, the first primary color sub-pixel region, the second primary color sub-pixel region and the third primary color sub-pixel region respectively; and a plurality of switching elements that are arranged in one-to-one correspondence with the pixel electrodes and configured to switch the corresponding pixel electrodes, wherein the white sub-pixel region is provided with a plurality of switching elements. A colored picture displayed by a liquid crystal display screen (Continued)

using this array substrate or liquid crystal panel can have a low distortion degree and a high optical grade.

18 Claims, 5 Drawing Sheets

(51) Int. Cl.
    *G02F 1/1343*     (2006.01)
    *G02F 1/1362*     (2006.01)
    *G02F 1/136*     (2006.01)
    *G02F 1/1335*     (2006.01)

(52) U.S. Cl.
    CPC .. *G02F 1/136286* (2013.01); *G02F 1/133514* (2013.01); *G02F 2001/13606* (2013.01); *G02F 2001/134345* (2013.01); *G02F 2201/122* (2013.01); *G02F 2201/123* (2013.01); *G02F 2201/40* (2013.01); *G02F 2201/52* (2013.01)

(56) References Cited

U.S. PATENT DOCUMENTS

2016/0035292 A1\* 2/2016 Lee ................... G09G 3/3648
    345/694
2016/0179270 A1\* 6/2016 Li ........................ G06F 3/0416
    345/173
2016/0357061 A1\* 12/2016 Bang ................. G02F 1/133514

FOREIGN PATENT DOCUMENTS

| CN | 102693701 | 9/2012 |
|---|---|---|
| CN | 105652540 | 6/2016 |
| CN | 105717719 | 6/2016 |
| KR | 20160027600 | 3/2016 |
| KR | 20160067250 | 6/2016 |

OTHER PUBLICATIONS

Search Report and Written Opinion, dated May 31, 2017, for International Application No. PCT/CN2016/112156.
Office Action and Search Report, dated Jul. 28, 2017 for Chinese Patent Application No. 201610958139.6.

\* cited by examiner

LIQUID CRYSTAL PANEL AND ARRAY SUBSTRATE THEREOF

CROSS-REFERENCE TO RELATED APPLICATIONS

The present application claims the priority of Chinese patent application CN 201610958139.6, entitled "Liquid crystal panel and array substrate thereof" and filed on Nov. 2, 2016, the entirety of which is incorporated herein by reference.

FIELD OF THE INVENTION

The present disclosure relates to liquid crystal display technology, and in particular, to a liquid crystal panel and an array substrate thereof.

BACKGROUND OF THE INVENTION

Currently, a liquid crystal display device generally comprises a backlight module and a liquid crystal panel. The liquid crystal panel covers the backlight module. The backlight module is used as a light source of the liquid crystal panel. The liquid crystal panel can modulate light emitted by the backlight module, so that images and colors can be displayed thereon. With development of liquid crystal display technology, it is required to increase brightness of a display screen as much as possible with power consumption of the backlight module being as low as possible, and meanwhile, it is also required to obtain a high optical grade of the display screen.

As shown in FIG. 1, there are four kinds of sub-pixels in an existing RGBW liquid crystal panel 1a: a red sub-pixel 2a, a green sub-pixel 3a, a blue sub-pixel 4a and a white sub-pixel 5a. A group of the red sub-pixel 2a, the green sub-pixel 3a, the blue sub-pixel 4a and the white sub-pixel 5a constitutes one pixel. Compared with an existing RGB liquid crystal panel, one white sub-pixel 5a is added in order to increase display brightness of the liquid crystal panel and reduce power consumption of the backlight module.

In normal display, only when the red sub-pixel 2a, the green sub-pixel 3a and the blue sub-pixel 4a in a same pixel are all turned on, will the white sub-pixel 5a be turned on. Otherwise, if one of the red sub-pixel 2a, the green sub-pixel 3a and the blue sub-pixel 4a is not turned on, the white sub-pixel 5a will be in an off state.

Therefore, as compared with the RGB liquid crystal panel, when a single color picture or a multiple color picture is displayed on the RGBW liquid crystal panel, the RGBW liquid crystal panel 1a has lower brightness during single color picture display and picture distortion will be resulted in, which will seriously affect the optical grade of the picture.

SUMMARY OF THE INVENTION

The technical problem to be solved by the present disclosure is how to improve an optical grade of a picture of an RGBW liquid crystal panel.

In order to solve the above technical problem, the present disclosure provides an array substrate, which comprises: a transparent baseplate, wherein the transparent baseplate comprises pixel regions on one surface thereof, and the pixel regions each comprise a white sub-pixel region, a first primary color sub-pixel region, a second primary color sub-pixel region and a third primary color sub-pixel region; a plurality of pixel electrodes that are arranged in the white sub-pixel region, the first primary color sub-pixel region, the second primary color sub-pixel region and the third primary color sub-pixel region respectively; and a plurality of switching elements that are arranged in one-to-one correspondence with the pixel electrodes and configured to switch the corresponding pixel electrodes, wherein the white sub-pixel region is provided with a plurality of switching elements.

In one specific embodiment, the plurality of switching elements are all arranged in the white sub-pixel region.

In one specific embodiment, the white sub-pixel region is adjacent to the first primary color sub-pixel region, the second primary color sub-pixel region and the third primary color sub-pixel region respectively.

In one specific embodiment, the white sub-pixel region, the first primary color sub-pixel region, the second primary color sub-pixel region and the third primary color sub-pixel region all have a rectangular shape. Three sides of the white sub-pixel region respectively coincide with one side of the first primary color sub-pixel region, the second primary color sub-pixel region and the third primary color sub-pixel region.

In one specific embodiment, the plurality of switching elements are uniformly distributed at two ends of a pixel electrode in the white sub-pixel region.

In one specific embodiment, a number of the switching elements in one of the pixel regions is four, and the four switching elements are located at four corners of the white sub-pixel region respectively.

In one specific embodiment, the array substrate further comprises a plurality of scanning lines extending along a horizontal direction of the array substrate and arranged in sequence along a vertical direction thereof, and a plurality of data lines extending along a vertical direction of the array substrate and arranged in sequence along a horizontal direction thereof, wherein the white sub-pixel region, the first primary color sub-pixel region, the second primary color sub-pixel region and the third primary color sub-pixel region each are a minimum grid of rectangular grids divided by the data lines and the scanning lines.

In one specific embodiment, the transparent baseplate comprises a plurality of pixel regions arranged in the horizontal direction, and two adjacent pixel regions in the horizontal direction are mutual reversed.

In one specific embodiment, the switching elements are thin film transistors, and gates, drains and sources of the switching elements are in sequence connected with the scanning lines, the data lines and the pixel electrodes respectively.

The present disclosure further provides a liquid crystal panel, which comprises the array substrate as described above.

Since more than two of the switching elements corresponding to the pixel electrodes in the first primary color sub-pixel region, the second primary color sub-pixel region, the third primary color sub-pixel region and the white sub-pixel region in a same pixel region are disposed in the white sub-pixel region, brightness of the white sub-pixel will be reduced while brightness of at least one of three primary color sub-pixels will be increased. A colored picture displayed by a liquid crystal display screen using this array substrate or liquid crystal panel can have a low distortion degree and a high optical grade.

BRIEF DESCRIPTION OF THE DRAWINGS

The present disclosure will be described in more detail based on embodiments and with reference to accompanying drawings. In the drawings.

Figure 1:
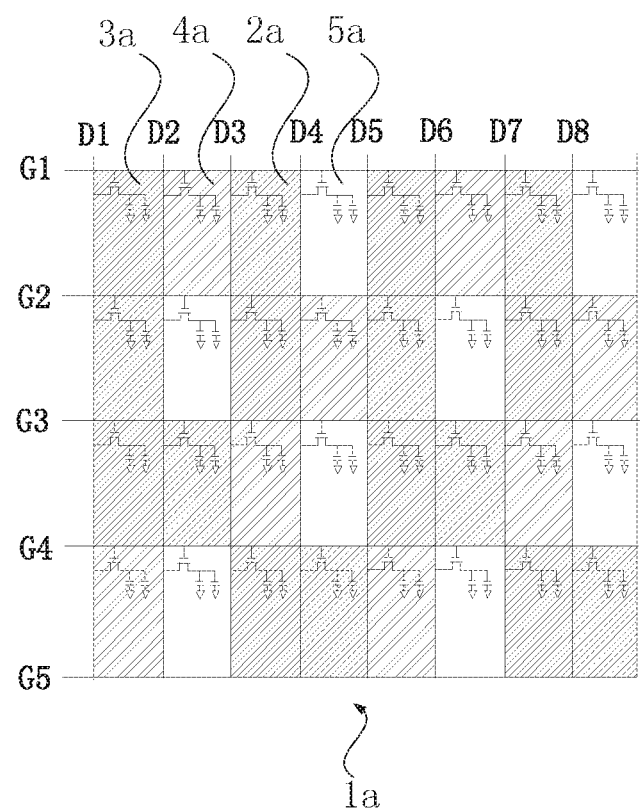
FIG. 1 is an equivalent circuit diagram of an RGBW liquid crystal panel in the prior art.

In the drawings, the same components are indicated with the same reference signs. The drawings are not drawn in accordance with an actual scale.

DETAILED DESCRIPTION OF THE EMBODIMENTS

The present disclosure will be further explained hereinafter combining the accompanying drawings.

Figure 2:
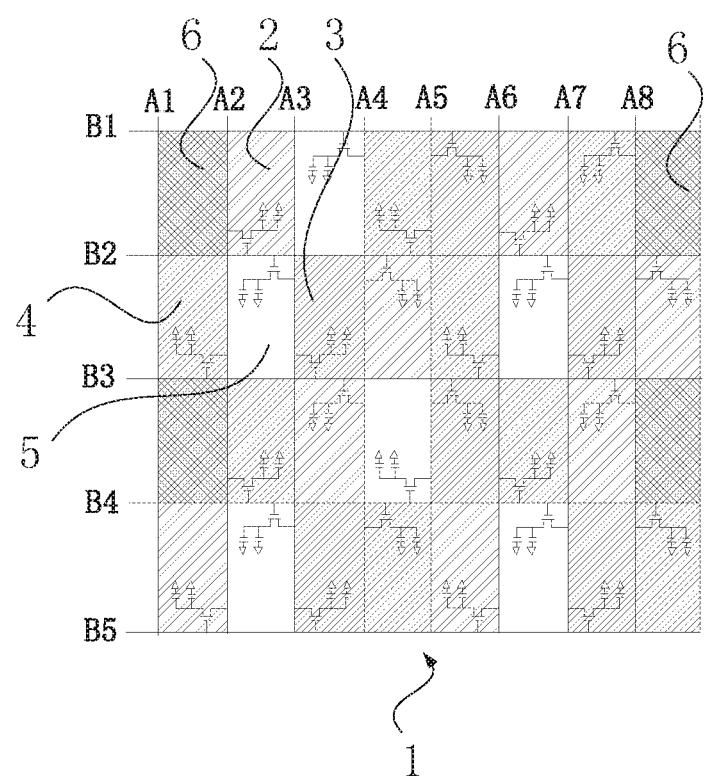
FIG. 2 is an equivalent circuit diagram of a liquid crystal panel in a first embodiment of the present disclosure.

FIG. 2 schematically shows a liquid crystal panel 1 in a first embodiment of the present disclosure. The liquid crystal panel 1 comprises an array substrate, a color filter substrate and a liquid crystal layer. The array substrate and the color filter substrate are arranged in parallel with each other, and liquid crystals are filled between the array substrate and the color filter substrate to form the liquid crystal layer.

The color filter substrate comprises an upper polarizer, a glass baseplate, a color filter, a common electrode layer and an upper alignment film. The upper polarizer, the glass baseplate, the color filter, the common electrode layer and the upper alignment film are laminated together.

The array substrate comprises a lower alignment film, a TFT array layer, a transparent baseplate and a lower polarizer. The lower alignment film, the TFT array layer, the transparent baseplate and the lower polarizer are laminated together.

A polarization direction of the upper polarizer and that of the lower polarizer are perpendicular to each other. Visible light emitted by a backlight module is filtered by the lower polarizer to become polarized light. The liquid crystals are arranged between the upper alignment film and the lower alignment film. Grooves on the upper alignment film and grooves on the lower alignment film extend along different directions so that liquid crystal molecules are substantially in parallel with the array substrate and are in twisted alignment gradually from the upper alignment film to the lower alignment film. In the liquid crystal panel 1 of a TFT-LCD (thin film transistor liquid crystal display device), the liquid crystal molecules in twisted alignment usually have a twist angle of 90° so that polarized light passing through the liquid crystal layer has a minimum light flux.

The transparent baseplate of the array substrate can be a glass baseplate. The TFT array layer is etched on one surface of the transparent baseplate. The TFT array layer comprises a plurality of scanning lines (B1-B5), a plurality of data lines (A1-A8), a plurality of pixel electrodes 8 and a plurality of switching elements 7. The plurality of scanning lines (B1-B5) are arranged on the surface of the transparent baseplate in sequence along a vertical direction. The scanning lines (B1-B5) are parallel to one another, and a distance between two adjacent scanning lines is the same as that between any other two adjacent scanning lines. The scanning lines extend along a horizontal direction. The plurality of data lines (A1-A8) are arranged on the surface of the transparent baseplate in sequence along the horizontal direction. The data lines (A1-A8) are parallel to one another, and a distance between two adjacent data lines is the same as that between any other two adjacent data lines. The data lines (A1-A8) extend along the vertical direction. A plurality of grids are divided by the scanning lines (B1-B5) and the data lines (A1-A8) on the transparent baseplate. A minimum grid of the plurality of grids is preferably a rectangle. A plurality of pixel regions are divided on the surface of the transparent baseplate by the scanning lines and the data lines. Each of the pixel regions comprises a plurality of minimum grids consecutively arranged. Each of the minimum grids is one sub-pixel region. Each of the pixel regions comprises four sub-pixel regions, i.e., a first primary color sub-pixel region 2, a second primary color sub-pixel region 3, a third primary color sub-pixel region 4 and a white sub-pixel region 5.

Figure 3:
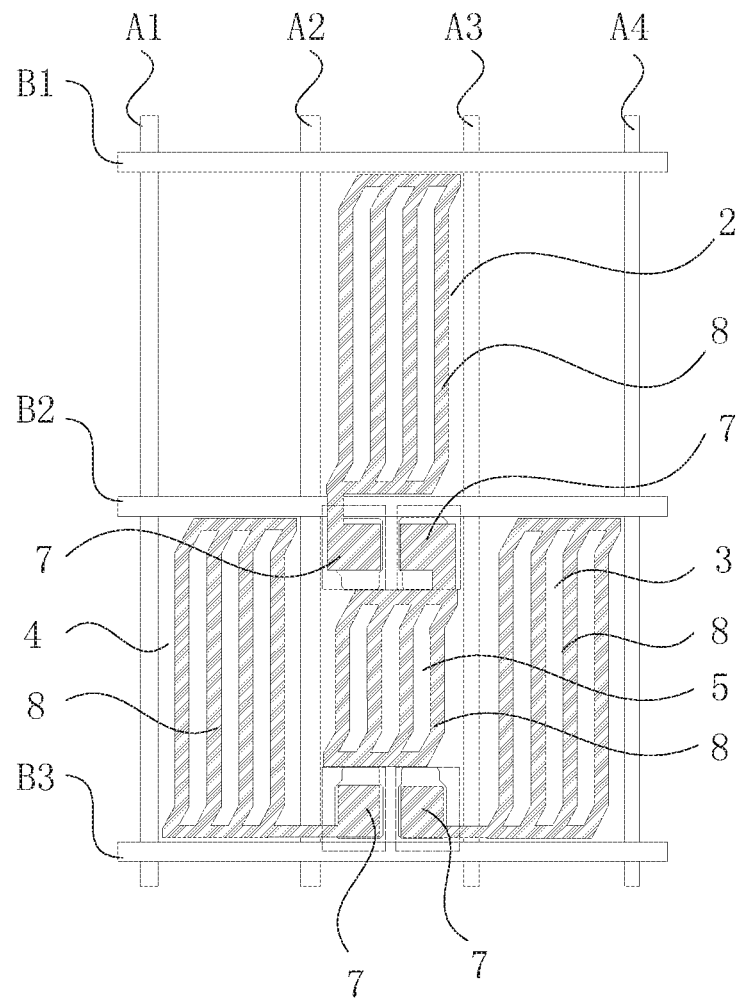
FIG. 3 schematically shows a structure of a single pixel region of an array substrate in the first embodiment of the present disclosure.

As shown in FIG. 3, the first primary color sub-pixel region 2, the second primary color sub-pixel region 3, the third primary color sub-pixel region 4 and the white sub-pixel region 5 each are provided with one pixel electrode therein. The pixel electrode is generally a bulk film. Preferably, the pixel electrode fills up the minimum grid as much as possible. The scanning lines (B1-B5), the data lines (A1-A8) and the pixel electrodes 8 are insulated from each other. A common electrode, the scanning lines (B1-B5), the data lines (A1-A8) and the pixel electrodes 8 are all transparent, and are all obtained by an ITO (Indium Tin Oxide) film after etching. The scanning lines (B1-B5) and the data lines (A1-A8) are respectively used for connecting a gate controller and a source controller.

The switching elements 7 are arranged in one-to-one correspondence with the pixel electrodes 8. One switching element 7 is connected with one scanning line, one data line and one pixel electrode respectively. When receiving electric signals from the gate controller and the source controller at the same time, the switching element 7 is turned on so that the pixel electrode 8 is powered. When the switching element 7 is a thin film transistor, a gate, a drain and a source of the switching element 7 are connected to the scanning line, the data line and the pixel electrode 8 via wires respectively. After electric signals are sent to one switching element 7 by the gate controller and the source controller respectively at the same time, the source and the drain of the switching element 7 are conducted therebetween, and the pixel electrode 8 corresponding to this switching element 7 is powered. After the pixel electrode 8 is powered, an electric field is formed between the pixel electrode 8 and the common electrode, and the electric field changes molecular arrangement of the liquid crystals in the liquid crystal layer so that the polarized light can pass through the liquid crystal layer at this place, and a function of the liquid crystal layer as a light valve can be realized.

The color filter comprises a black matrix, three primary color films and a white film. The black matrix is in a form of grids, and is generally uniform rectangular grids. The black matrix is used for shading light. The black matrix is aligned with the grids formed by the data lines and the scanning lines. The three primary color films can be a red film, a green film and a blue film respectively. The three primary color films and the white film are all filled in minimum grids of the black matrix. The three primary color films are aligned with the first primary color sub-pixel region 2, the second primary color sub-pixel region 3 and the third primary color sub-pixel region 4 respectively. The white film is aligned with the white sub-pixel region 5. The polarized light can be changed into a corresponding primary color light after passing through a certain primary color film. For example, after passing through the red film, the green film and the blue film, the polarized light can be changed into red light, green light and blue light respectively, White light is formed after mixture of the three primary color light in equal proportion. The polarized light is a white light after passing through the white film.

As shown in FIG. 3, the switching devices 7 corresponding to the pixel electrodes 8 in the first primary color sub-pixel region 2, the second primary color sub-pixel region 3, the third primary color sub-pixel region 4 and the white sub-pixel region 5 in a same pixel region are all disposed in the white sub-pixel region 5. The switching elements 7 have a lower light transmittance. Therefore, the light transmittance of the first primary color sub-pixel region 2, the second primary color sub-pixel region 3 and the third primary color sub-pixel region 4 are increased, while the light transmittance of the white sub-pixel region 5 is reduced. Accordingly, an aperture ratio of the white sub-pixel can be reduced while an aperture ratio of the three primary color sub-pixels can be increased. When an image is displayed on a liquid crystal display screen, brightness of the white sub-pixel is reduced and brightness of the three primary color sub-pixels is increased. Therefore, when a colored picture is displayed on the liquid crystal display screen, the colored picture can have a low distortion degree and a high optical grade. Meanwhile, when a white picture is display thereon, the brightness of the picture will not be reduced.

Preferably, in a same pixel region, the white sub-pixel region 5 is adjacent to the first primary color sub-pixel region 2, the second primary color sub-pixel region 3 and the third primary color sub-pixel region 4 respectively. In this manner, the wires between the switching elements 7 and the pixel electrodes 8 are very short, and connection between the switching elements 7 and the pixel electrodes 8 can be realized without wire winding, and parasitic capacitance generated in the pixel can be reduced.

More preferably, the white sub-pixel region 5, the first primary color sub-pixel region 2, the second primary color sub-pixel region 3 and the third primary color sub-pixel region 4 all have a rectangular shape, and three sides of the white sub-pixel region 5 are respectively coincide with one side of the first primary color sub-pixel region 2, the second primary color sub-pixel region 3 and the third primary color sub-pixel region 4. The three sides of the white sub-pixel region 5 are enclosed by the first primary color sub-pixel region 2, the second primary color sub-pixel region 3 and the third primary color sub-pixel region 4. Therefore, a structure of each pixel has a shape as shown in FIG. 3, and color mixing of the single pixel is more uniform.

More preferably, in each pixel region, the plurality of switching elements 7 are uniformly distributed at two ends of the pixel electrode in the white sub-pixel region. Thus, generation of parasitic capacitance in the pixel can be effectively reduced. More preferably, a number of the switching elements 7 in one of the pixel regions is four, and the four switching elements 7 are located at four corners of the white sub-pixel region 5 respectively. In this manner, the length of the wires required therein is short, and the parasitic capacitance is reduced.

More preferably, two switching elements 7 located at a top of the white sub-pixel region 5 respectively control pixel electrodes located at the top of the white sub-pixel region 5 and inside the white sub-pixel region 5, and two switching elements 7 located at a bottom of the white sub-pixel region 5 respectively control two pixel electrodes respectively located at two sides of the white sub-pixel region 5.

More preferably, the transparent baseplate comprises a plurality of pixel regions arranged in the horizontal direction. The structure of each pixel has the shape as shown in FIG. 3. Two adjacent pixel regions in the horizontal direction are mutual reversed. When being arranged in the horizontal direction, two adjacent pixel regions are engaged with each other. In this manner, the pixels with the shape as shown in FIG. 3 can be arranged uniformly and densely in the horizontal direction. More preferably, simulated sub-pixels 6 are provided on the color films corresponding to a first grid and a last grid of a row of pixels in which no pixel electrode is provided. The simulated sub-pixels 6 are made of a light-shielding material.

This embodiment is a preferred embodiment. It is obvious that, when more than two of the switching elements 7 corresponding to the pixel electrodes S in the first primary color sub-pixel region 2, the second primary color sub-pixel region 3, the third primary color sub-pixel region 4 and the white sub-pixel region 5 in the same pixel region are disposed in the white sub-pixel region 5, brightness of the white sub-pixel will be reduced while brightness of at least one of the three primary color sub-pixels will be increased. Therefore, the distortion degree of the colored picture displayed on the liquid crystal display screen can be reduced, and the optical grade of the picture can be improved.

Figure 4:
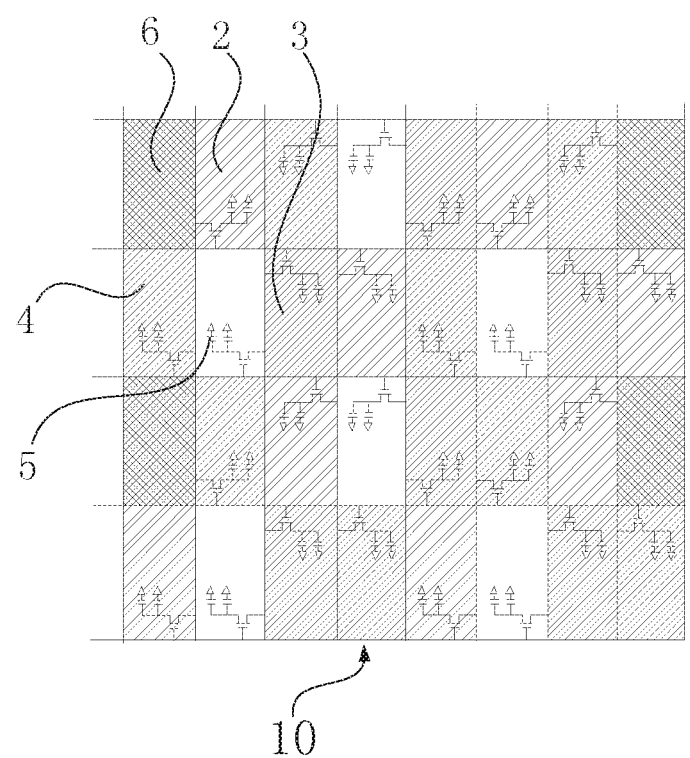
FIG. 4 is an equivalent circuit diagram of a liquid crystal panel in a second embodiment of the present disclosure.

FIG. 4 schematically shows a liquid crystal panel 10 in a second embodiment of the present disclosure. The liquid crystal panel 10 in the second embodiment mainly differs from the liquid crystal panel 1 in the first embodiment in that, pixel electrodes 8 corresponding to switching elements 7 are reduced. The difference will be introduced in a next paragraph.

Figure 5:
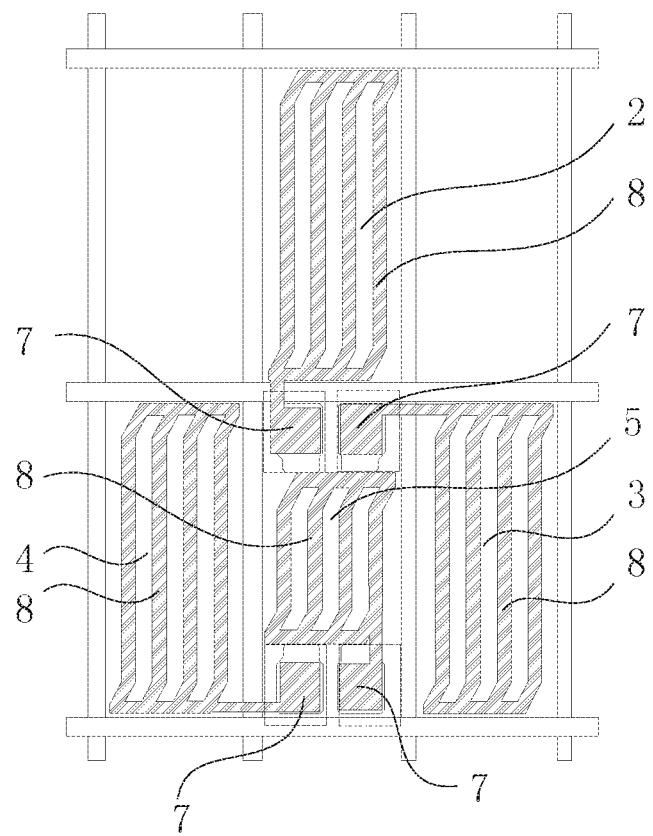
FIG. 5 schematically shows a structure of a single pixel region of an array substrate in the second embodiment of the present disclosure.

As shown in FIG. 5, two switching elements 7 located at a bottom of the white sub-pixel region 5 respectively control two pixel electrodes 8 located at one side of the white sub-pixel region 5 and inside the white sub-pixel region 5, and two switching elements 7 located at a top of the white sub-pixel region 5 respectively control two pixel electrodes 8 respectively located at the other side of the white sub-pixel region 5 and the top of the white sub-pixel region 5.

Although the present disclosure has been described with reference to the preferred embodiments, various modifications can be made thereto and equivalents can be substituted for components thereof without departing from the scope of the present disclosure. In particular, technical features recited in individual embodiments can be combined in any way so long as no structural conflict exists. The present disclosure is not limited to the particular embodiments disclosed herein, but includes all the technical solutions falling within the scope of the claims.

The invention claimed is:

1. An array substrate, comprising:
   a transparent baseplate, wherein the transparent baseplate comprises pixel regions on one surface thereof, and the pixel regions each comprise a white sub-pixel region, a first primary color sub-pixel region, a second primary color sub-pixel region and a third primary color sub-pixel region;
   a plurality of pixel electrodes that are arranged in the white sub-pixel region, the first primary color sub-pixel region, the second primary color sub-pixel region and the third primary color sub-pixel region respectively; and
   a plurality of switching elements that are arranged in one-to-one correspondence with the pixel electrodes and configured lo switch the corresponding pixel electrodes, wherein the while sub-pixel region is provided with a plurality of switching elements;

wherein the array substrate further comprises a plurality of scanning lines extending along a horizontal direction of the array substrate and arranged in sequence along a vertical direction thereof, and a plurality of data lines extending along a vertical direction of the array substrate and arranged in sequence along a horizontal direction thereof, wherein the white sub-pixel region, the first primary color sub-pixel region, the second primary color sub-pixel region and the third primary color sub-pixel region each are a minimum grid of rectangular grids divided by the data lines and the scanning lines.

2. The array substrate according to claim 1, wherein the plurality of switching elements are all arranged in the white sub-pixel region.

3. The array substrate according to claim 2, wherein the while sub-pixel region is adjacent to the first primary color sub-pixel region, the second primary color sub-pixel region and the third primary color sub-pixel region respectively.

4. The array substrate according to claim 3, wherein the white sub-pixel region, the first primary color sub-pixel region, the second primary color sub-pixel region and the third primary color sub-pixel region all have a rectangular shape; and wherein three sides of the white sub-pixel region respectively coincide with one side of the first primary color sub-pixel region, the second primary color sub-pixel region and the third primary color sub-pixel region.

5. The array substrate according to claim 4, wherein the plurality of switching elements are uniformly distributed at two ends of a pixel electrode in the while sub-pixel region.

6. The array substrate according to claim 5, wherein a number of the switching elements in one of the pixel regions is four, and the four switching elements are located at four corners of the white sub-pixel region respectively.

7. The array substrate according to claim 2, further comprising a plurality of scanning lines extending along a horizontal direction of the array substrate and arranged in sequence along a vertical direction thereof, and a plurality of data lines extending along a vertical direction of the array substrate and arranged in sequence along a horizontal direction thereof, wherein the while sub-pixel region, the first primary color sub-pixel region, the second primary color sub-pixel region and the third primary color sub-pixel region each are a minimum grid of rectangular grids divided by the data lines and the scanning lines.

8. The array substrate according to claim 7, wherein the transparent baseplate comprises a plurality of pixel regions arranged in the horizontal direction, and two adjacent pixel regions in the horizontal direction are mutual reversed.

9. The array substrate according to claim 7, wherein the switching elements are thin film transistors, and gates, drains and sources of the switching elements are in sequence connected with the scanning lines, the data lines and ills pixel electrodes respectively.

10. The array substrate according to claim 3, further comprising a plurality of scanning lines extending along a horizontal direction of the array substrate and arranged in sequence along a vertical direction thereof, and a plurality of data lines extending along a vertical direction of the array substrate and arranged in sequence along a horizontal direction thereof, wherein the white sub-pixel region, the first primary color sub-pixel region, the second primary color sub-pixel region and the third primary color sub-pixel region each are a minimum grid of rectangular grids divided by the data lines and the scanning lines.

11. The array substrate according to claim 10, wherein the transparent baseplate comprises a plurality of pixel regions arranged in the horizontal direction, and two adjacent pixel regions in the horizontal direction are mutual reversed.

12. The array substrate according to claim 10, wherein the switching elements are thin film transistors, and gates, drains and sources of the switching elements are in sequence connected with the scanning lines, the data lines and the pixel electrodes respectively.

13. The array substrate according to claim 4, further comprising a plurality of scanning lines extending along a horizontal direction of the array substrate and arranged in sequence along a vertical direction thereof, and a plurality of data lines extending along a vertical direction of the array substrate and arranged in sequence along a horizontal direction thereof, wherein the white sub-pixel region, the first primary color sub-pixel region, the second primary color sub-pixel region and the third primary, color sub-pixel region each are a minimum grid of rectangular grids divided by the data lines and the scanning lines.

14. The array substrate according to claim 13, wherein the transparent baseplate comprises a plurality of pixel regions arranged in the horizontal direction, and two adjacent pixel regions in the horizontal direction are mutual reversed.

15. The array substrate according to claim 13, wherein the switching elements are thin film transistors, and gates, drains and sources of the switching elements are in sequence connected with the scanning lines, the data lines and the pixel electrodes respectively.

16. The array substrate according to claim 1, wherein the transparent baseplate comprises a plurality of pixel regions arranged in the horizontal direction, and two adjacent pixel regions in the horizontal direction are mutual reversed.

17. The array substrate according to claim 1, wherein the switching elements are thin film transistors, and gates, drains and sources of the switching elements are in sequence connected with the scanning lines, the data lines and the pixel electrodes respectively.

18. A liquid crystal panel, comprising an array substrate according to claim 1.

* * * * *